(12) United States Patent
Shaner et al.

(10) Patent No.: US 11,125,700 B2
(45) Date of Patent: Sep. 21, 2021

(54) APPARATUS AND METHOD TO MEASURE SEMICONDUCTOR OPTICAL ABSORPTION USING MICROWAVE CHARGE SENSING

(71) Applicant: National Technology & Engineering Solutions of Sandia, LLC, Albuquerque, NM (US)

(72) Inventors: Eric A. Shaner, Rio Rancho, NM (US); Michael Goldflam, Albuquerque, NM (US); Clark N. Kadlec, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 165 days.

(21) Appl. No.: 16/543,891

(22) Filed: Aug. 19, 2019

(65) Prior Publication Data

US 2020/0057006 A1 Feb. 20, 2020

Related U.S. Application Data

(60) Provisional application No. 62/719,846, filed on Aug. 20, 2018.

(51) Int. Cl.
*G01N 22/02* (2006.01)
*H01S 3/091* (2006.01)
*H05B 6/64* (2006.01)

(52) U.S. Cl.
CPC ............ *G01N 22/02* (2013.01); *H01S 3/091* (2013.01); *H05B 6/64* (2013.01)

(58) Field of Classification Search
CPC .......... H05B 6/64; G01N 22/02; G01N 22/00; G01N 22/04; G01N 22/005; H01S 3/091; G01R 27/04
See application file for complete search history.

(56) References Cited

U.S. PATENT DOCUMENTS 6,008,906 A * 12/1999 Maris ................. G01N 21/1717
250/226
2008/0245964 A1* 10/2008 Miles ...................... G01N 22/00
250/288

OTHER PUBLICATIONS

Olson, B.V. et al., "Identification of dominant recombination mechanisms in narrow-bandgap InAs/InAsSb type-II superlattices and InAsSb alloys", Applied Physics Letters 103 (2013), pp. 052106-1-052106-4.

(Continued)

*Primary Examiner* — Jermele M Hollington
*Assistant Examiner* — Suresh K Rajaputra
(74) *Attorney, Agent, or Firm* — Kevin W. Bieg

(57) ABSTRACT

A time-resolved microwave reflectance apparatus comprises a pulsed or modulated optical source that irradiates a semiconductor sample with an excitation pump beam, a microwave oscillator that irradiates the sample with a continuous beam of microwaves, and a microwave detector that detects the microwaves reflected by the sample. Therefore, charge detection, rather than conventional absorption measurements (that detect the loss of photons), can be used to extract the absorption coefficient and band edge of a semiconductor material.

9 Claims, 3 Drawing Sheets

(56) References Cited

OTHER PUBLICATIONS

Olson, B.V. et al., "Intensity- and Temperature-Dependent Carrier Recombination in InAs=InAs1-xSbx Type-II Sup12.erlattices", Physical Review Applied 3 (2015), pp. 044010-1-0440101-12.

Kadlec, E.A., "Effects of electron doping level on minority carrier lifetimes in n-type mid-wave infrared InAs/InAs1-xSbx type-II superlattices", Applied Physics Letters 109 (2016), pp. 261105-1-261105-5.

* cited by examiner

APPARATUS AND METHOD TO MEASURE SEMICONDUCTOR OPTICAL ABSORPTION USING MICROWAVE CHARGE SENSING

CROSS-REFERENCE TO RELATED APPLICATION

This application claims the benefit of U.S. Provisional Application No. 62/719,846, filed Aug. 20, 2018, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to the measurement of semiconductor optical absorption and, in particular, a method and apparatus to measure semiconductor optical absorption using microwave charge sensing.

BACKGROUND OF THE INVENTION

Modern infrared (IR) research materials, such as type-II superlattices for next generation focal plane arrays, present numerous characterization challenges. Basic photoluminescence (PL) measurements of infrared materials can be problematic as signals are often extremely weak (e.g., poor signal-to-noise of instrumentation), particularly for research materials in the longwave infrared. Even 'straight-forward' absorption measurements, commonly done using Fourier-transform infrared spectroscopy (FTIR), require great care and extensive sample preparation as referencing issues (e.g., varying levels of substrate absorption) can cause large errors. The main goal of a PL measurement is to identify the bandgap of the material by absorbing photons above the bandgap and waiting for them to trickle down to the band edge and emit light that can be analyzed by FTIR. However, in defective materials, the PL signal is often too low for observation.

SUMMARY OF THE INVENTION

The present invention is directed to an apparatus and method to measure semiconductor optical absorption using microwave charge sensing. A time-resolved microwave reflectance apparatus comprises a pulsed or modulated optical source that irradiates a semiconductor sample with an optical excitation pump beam, a microwave oscillator that irradiates the sample with a continuous beam of microwaves, and a microwave detector that detects the microwaves reflected by the sample. The method comprises irradiating the sample with the pulsed or modulated optical excitation pump beam and measuring the time decay of the microwaves reflected from the sample after irradiation by the optical excitation pump beam. The method can further comprise repeating the irradiating and measuring steps for a plurality of energies of a wavelength tunable optical excitation source. For example, the plurality of energies can be tuned over the band gap energy of the semiconductor. Therefore, charge detection, rather than conventional absorption measurements (that detect the loss of photons), can be used to extract the absorption coefficient and band edge of a semiconductor material.

BRIEF DESCRIPTION OF THE DRAWINGS

The detailed description will refer to the following drawings, wherein like elements are referred to by like numbers.

DETAILED DESCRIPTION OF THE INVENTION

Microwave detection techniques, such as microwave reflectance, can potentially be used in scenarios where one would normally defer to PL or FTIR based characterization as the only alternatives. Microwave measurements sense the presence of free charge within the material and can be done in a completely non-contact, non-destructive manner. For example, microwave-based reflectance measurements are routinely used to measure minority carrier lifetime and extract Shockley-Read-Hall, radiative, and Auger coefficients. See B. V. Olson et al., *Appl. Phys. Lett.* 103, 052106 (2013), B. V. Olson et al., *Phys. Rev. Appl.* 3, 044010 (2015), and E. A. Kadlec et al., *Appl. Phys. Lett.* 109, 261105 (2016).

Figure 1:
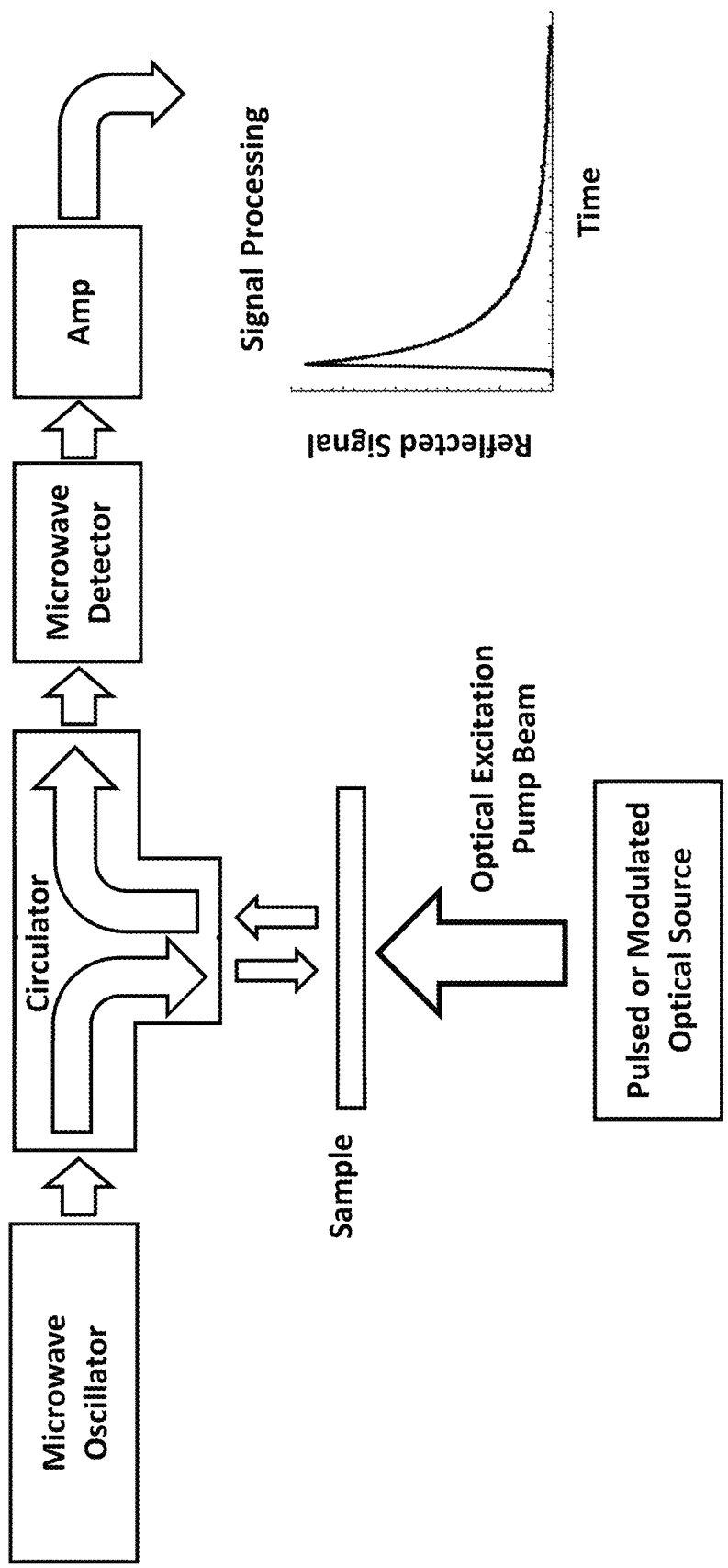
FIG. 1 is a schematic illustration of a time-resolved microwave reflectance apparatus.

In FIG. 1 is illustrated a time-resolved microwave reflectance apparatus of the present invention. Various combinations of microwave components, optical sources, and amplifiers can be used to realize the time-resolved microwave reflectance apparatus. An optical excitation pump beam irradiates the front side of a semiconductor sample and excites charge carriers in the absorber layer of the sample, thereby altering the conductivity of the sample. For example, the optical source can comprise a wavelength tunable pulsed optical source, such as a pulsed laser (e.g., a quantum cascade laser or optical parametric oscillator (OPO)), or pulsed light-emitting diode. A microwave oscillator provides a continuous source of microwaves that can irradiate the back side of the sample. Microwaves reflected from the sample surface are sent to a microwave detector via a circulator. However, other arrangements, such as an off-angle reflectance measurement or a measurement using a beam splitter, can be used instead of a circulator. A variety of charge probes can be used to detect the charge carriers. The detected microwave signal can be amplified using a wide-bandwidth preamplifier and displayed using a high-resolution digitizer. The transient reflected microwaves can therefore detect the conductivity change in the sample and monitor the decay of the charge carriers back to equilibrium, thereby providing a measurement of the excited carrier density and the carrier lifetime. An exemplary apparatus was constructed that used commercial-of-the-shelf (COTS) components, including a broadly tunable (2 to 12 microns) OPO for pump pulse excitation of the sample, a 94-GHz Gunn diode microwave oscillator for microwave irradiation of the sample, a 94-GHz circulator with a 94-GHz isolator, a W-band horn antenna and W-band Schottky diode for direct detection of the reflected microwaves, and a 1 GHz oscilloscope for recording the reflected microwave signal. The microwave measurement can be performed at any frequency where the apparatus is sensitive to charge in the material under test. Although components are most easily obtained in the infrared portion of the spectrum (e.g., from 1 to 100 microns wavelength), similar measurements could be performed at THz frequencies (e.g., greater than 100 microns wavelength), although sources and detectors are harder to acquire in that portion of the spectrum, or even at shorter wavelengths (e.g., less than 1 micron). The apparatus can have nanosecond time resolution, fast acquisition and high throughput, and can be extremely sensitive.

Alternatively, the method can use a DC or frequency domain measurement. The optical source can comprise a modulated continuous wave (CW) source, such as a CW laser, LED, or filtered blackbody source, such as a glowbar. The modulation frequency should be low compared to the inverse carrier recombination time in the material such that the carrier density in the material can follow the modulated excitation. A partially modulated CW source that consists of both DC and AC components can also be used. The microwave detector can be a homodyne or heterodyne detector combined with a mixer for detection of the modulated reflected microwave signal. Lock-in techniques can be used to demodulate the reflected microwave signal and extract the microwave reflectance change due to the modulated excitation. The amplitude of detected signal can then be related to the carrier density in a manner similar to the pulsed probe method.

According to the present invention, charge detection, rather than conventional absorption measurements (that detect loss of photons), can be used to extract the absorption coefficient and/or band edge of a semiconductor material. A microwave reflectance method can comprise monitoring the microwave reflectance amplitude while tuning a pulsed or modulated optical excitation source, and directly observing the variation in charge generated by the tunable optical excitation source through changes in the detected microwave amplitude to locate the band edge of a semiconductor material. While this method requires a widely tunable laser, it can be possible to use a broadband source output for carrier generation and implement the microwave reflectance as a new kind of FTIR detector, where charge, not infrared photons, are sensed.

To replace conventional FTIR absorption measurements, calibration of the microwave reflection apparatus described above is needed. The reflection coefficient of excitation pump radiation can be easily measured with a beam splitter arrangement. The microwave reflectance signal needs to be measured at a single point where no incident photons are transmitted through the material of interest (i.e., large optical absorption). This can be accommodated by choosing a short wavelength excitation (where the material absorption coefficient is high) and noting the number of photons incident on the sample along with the microwave response amplitude. Once the calibration reflectance value is obtained, tuning the laser wavelength while monitoring charge generation through the microwave response, and accounting for the reflected photon number, produces the relationship between incident photon number, laser wavelength, and generated charge number that can be directly converted to absorption coefficient. In contrast to FTIR-based measurements, no separate reference material is needed to determine the absorption coefficient and the test is completely non-destructive (i.e., it can be applied at wafer level). A microwave charge sensing analog of PL can also be obtained in a similar fashion that does not require shielding of a spectrometer from pump light.

Figure 2:
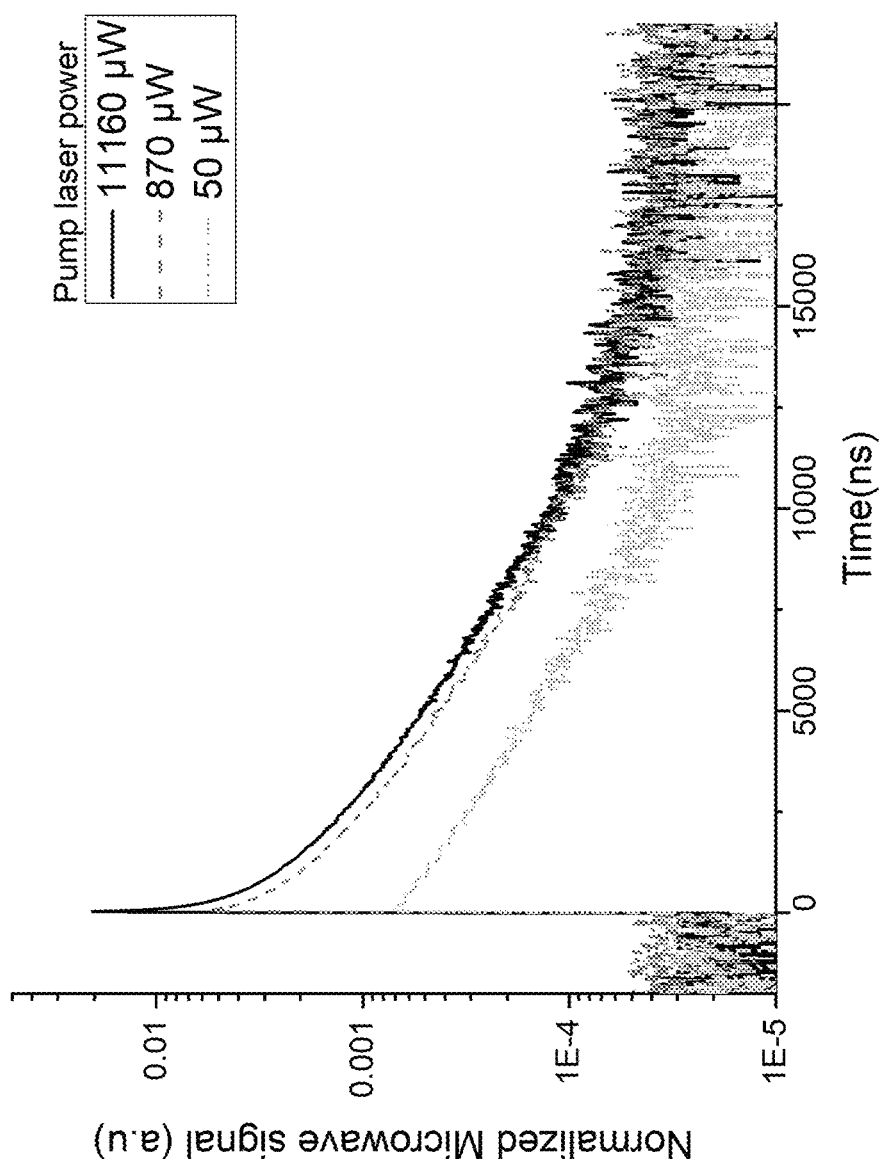
FIG. 2 is a plot of microwave reflection response to a pulsed laser excitation of a semiconductor at various pump laser powers.

Sweeping the wavelength of the pulsed or modulated optical excitation source and monitoring the reflected microwave amplitude can be used to determine the absorption coefficient of the material as a function of wavelength. An example of the microwave reflection response of an InAs/InAsSb superlattice to a pulsed laser pump is shown in FIG. 2. This figure shows the time-resolved microwave reflectance decay of carrier recombination in the superlattice semiconductor sample for various pump pulse energies. Energies were quantified using a thermal power meter and are expressed in term of power (i.e., pulse energy times repetition rate). Here, the pulse energy (power) was tuned to explore both high-injection as well as low-injection carrier dynamics. High-injection is defined as the condition where the excitation pump excites a carrier density higher than the background carrier density in the material under test. Low-injection is defined as the excitation pump being lower than the background carrier density in the material. The pump power ranged from 11160 uW to 50 uW to span the high-injection to low-injection regimes. In the high-injection regime, the microwave reflectance is not characterized by a single-exponential decay, but rather as a complicated temporal response as carriers recombine in the material. At 50 uW pump power, in the low-injection regime, a clear single-exponential response is observed. A benefit of working in the low-injection regime is that the relation between the microwave reflectance response and the pump excitation energy is linear. In the low-injection regime, the time-constant associated with the decay after pulsed pump excitation is known as the minority carrier lifetime. The decay of this long-duration tail can be used for minority carrier lifetime analysis. The absorption coefficient can be obtained from the initial peak response amplitude of the material to pulsed excitation. This peak value is directly related to the amount of charge generated in the material for a given pump wavelength. By scanning the pump wavelength and carefully tracking the number of incident pump photons (power) and recording this peak microwave reflectance response, a direct measurement of the photon-to-charge conversion can be used to determine the absorption coefficient of the material, as described above. Conversely, conventional spectroscopic techniques must track the loss of photons, to both reflection and transmission, to obtain a measurement of absorption coefficient.

Figure 3:
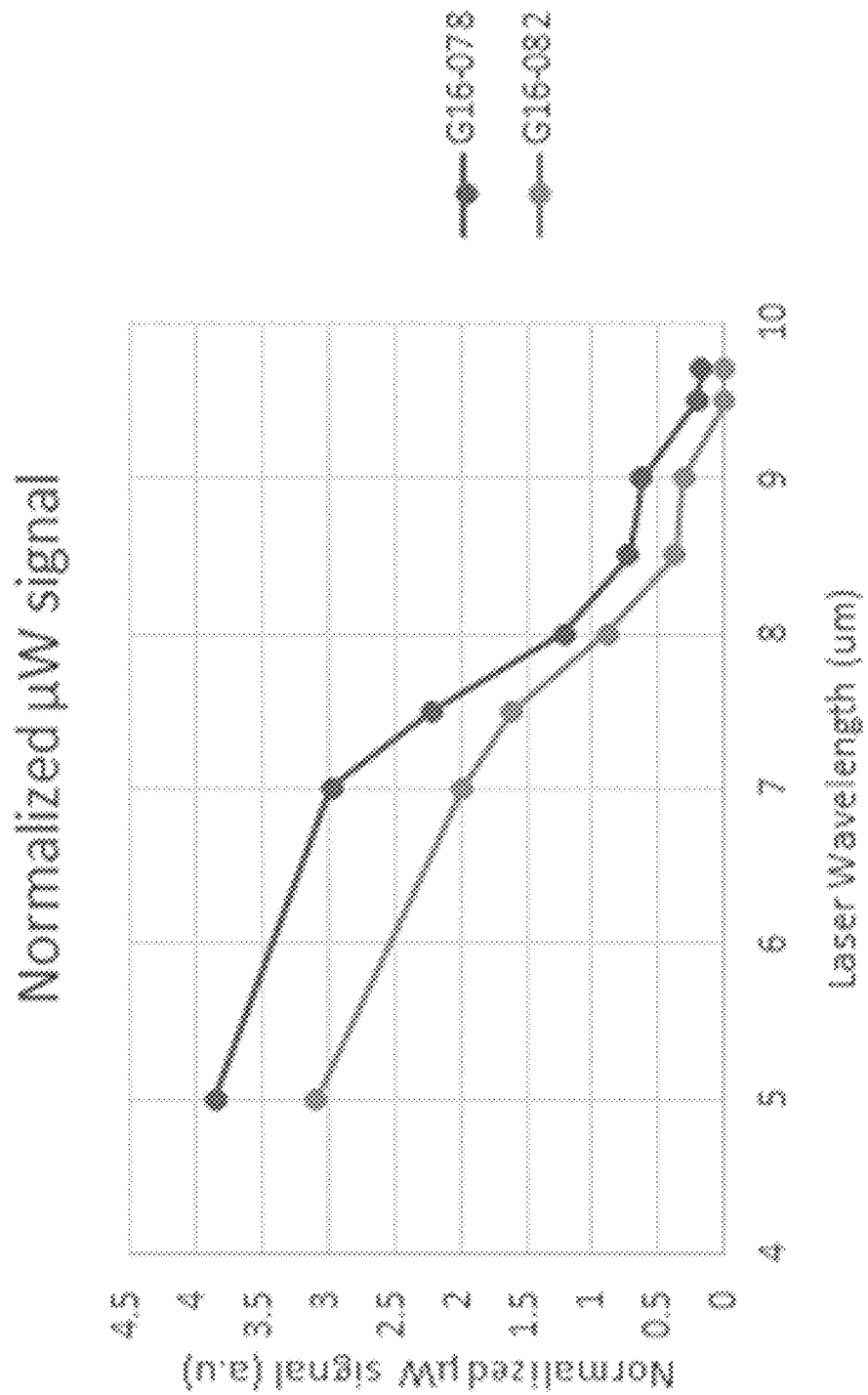
FIG. 3 is a plot of peak microwave response to pulsed laser excitation of two different semiconductor samples having a bandgap near 8 microns.

The initial peak of the response can used to identify the band edge. In FIG. 3, this initial peak response is plotted for two different InAsSb semiconductor samples that did not have observable PL signals, but that were designed to have a bandgap near 8 μm. The wavelength of the pulsed laser was tuned and the initial peak response is plotted. Clearly at wavelengths shorter than 8 μm, the laser wavelength is above the band edge, generating carriers that are sensed in microwave reflection. In contrast, there is little response at wavelengths longer than the band edge, suggesting a lack of carrier generation and, therefore, photon absorption. The general shape of this photoresponse vs wavelength matches the expected absorption coefficient behavior. While the above description relates to infrared (2-12 micron) wavelengths, the method can generally be applied at other wavelengths as well, including to measure the absorption coefficient and band edge of wide band gap semiconductors (e.g., GaN).

The present invention has been described as an apparatus and method to measure semiconductor optical absorption using microwave charge sensing. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method to measure semiconductor optical absorption using microwave charge sensing, comprising:
   providing a time-resolved microwave reflectance apparatus, the apparatus comprising
      a pulsed or modulated wavelength tunable optical source adapted to irradiate a semiconductor sample having an absorber layer with an optical excitation pump beam,
      a microwave oscillator adapted to irradiate the semiconductor sample with a continuous beam of microwaves, and
      a microwave detector adapted to detect microwaves reflected from the semiconductor sample;
   irradiating the semiconductor sample with the optical excitation pump beam at a calibration wavelength at which the optical excitation pump beam is not transmitted through the absorber layer of the semiconductor sample;
   measuring a peak response amplitude of a time decay of the microwaves reflected from the absorber layer of the semiconductor sample after irradiation of the semiconductor sample by the optical excitation pump beam at the calibration wavelength;
   irradiating the semiconductor sample with the optical excitation pump beam at a measurement wavelength;
   measuring a peak response amplitude of a time decay of the microwaves reflected from the absorber layer of the semiconductor sample after irradiation of the semiconductor sample by the optical excitation pump beam at the measurement wavelength; and
   comparing the peak response amplitude at the measurement wavelength to the peak response amplitude at the calibration wavelength to obtain an absorption coefficient at the measurement wavelength.

2. The method of claim 1, wherein the wavelength tunable optical source is tunable in a range less than 1-micron wavelength.

3. The method of claim 1, wherein the wavelength tunable optical source is tunable in a range between 1 and 100 microns wavelength.

4. The method of claim 3, wherein the wavelength tunable optical source is tunable in a range from 2 to 12 microns wavelength.

5. The method of claim 1, wherein the wavelength tunable optical source is tunable in a range greater than 100 microns wavelength.

6. The method of claim 1, wherein the method further comprises repeating the irradiating and measuring steps for a plurality of measurement wavelengths of the optical excitation pump beam of the wavelength tunable optical source to obtain an absorption coefficient as a function of wavelength.

7. The method of claim 6, wherein the plurality of wavelengths is tuned over the band gap energy of the semiconductor sample.

8. The method of claim 1, wherein the pulsed wavelength tunable optical source comprises a pulsed laser or light-emitting diode.

9. The method of claim 1, wherein the modulated wavelength tunable optical source comprises a modulated continuous wave laser, light-emitting diode, or filtered blackbody source.

* * * * *